United States Patent Office 3,715,867
Patented Feb. 13, 1973

3,715,867
APPARATUS FOR PURIFYING GASES
Katashi Aoi, 840 Juniso, Kamakura, Japan
Filed Nov. 30, 1970, Ser. No. 93,639
Int. Cl. B01f 3/04
U.S. Cl. 55—222    4 Claims

ABSTRACT OF THE DISCLOSURE

A gas separating chamber is defined in a box or vessel which has a gas inlet, a gas outlet and an exhaust tube. An adiabatic expansion chamber for separation and removal of toxic components in gases is positioned within the gas separating chamber and a cooling means for reducing the temperature of gases is disposed inside or outside of the vessel.

---

This invention relates to an apparatus for purifying gases such as stack gases. The invention is characterized by introducing gases, containing toxic substances such as sulfurous acid gas and hydrogen carbide, and water and which are expelled from stacks, into an adiabatic expansion chamber to separate and remove the toxic components and water by condensation due to reduction of the temperature of the gases. Simultaneously, residual harmless substances are released due to the reducing of the temperature of the gases by coolants.

The gases exhausted from the stacks of chemical works and petroleum refining works into the air contain toxic components such as sulfurous acid gas and hydrogen carbide, which are released into the atmosphere to constitute grievous public hazards.

This invention provides an apparatus for purifying gases for fundamentally eliminating these hazards in such a manner that the temperature of the exhausted gas is reduced by cooling with a coolant on adiabatic expansion, by which the gas can be condensed to separate and remove said toxic components. It is an object of the invention to make optimum the conditions of temperature for the condensation separation of the toxic components of exhausted gas to increase greatly the efficiency of such operation.

According to this invention, in an adiabatic expansion chamber for condensing and separating toxic components such as sulfurous acid gas and hydrogen carbide, effectiveness can be greatly increased by reducing the temperature by means of water cooling, air cooling, and cooling with coolants of such as Freon and ammonia.

In the attached drawings which show embodiments of this invention:

Figure 1:
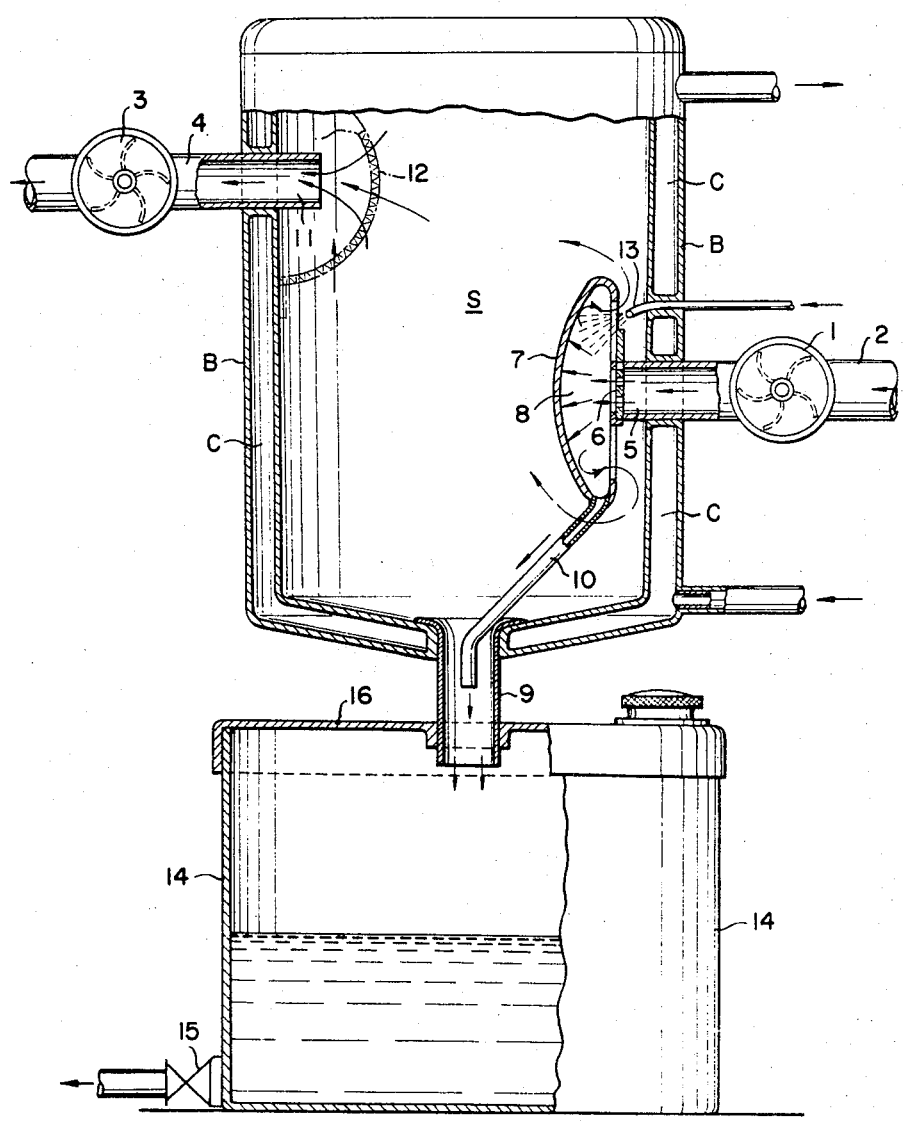
FIG. 1 is a front section of one embodiment of the invention.

In FIG. 1 is illustrated a gas separating chamber S positioned within a cylindrical box or vessel B provided with a cooling chamber C, such as a water chamber, on its outer side. A gas-introducing tube 2 is provided with a blower 1 serving as a gas-compressing apparatus and connected to the introduction side of the gas separator. To the clean gas-exhausting side, an exhausting tube 4 provided with a suction blower 3 is connected. A porous air-permeable material 6 is positioned almost vertically at the end of the aperture 5 of introducing tube 2. In front of the porous air-permeable material 6, a bowl-shaped barrier material 7 molded from a heat-resistant and chemical-resistant material is positioned almost vertically at a given interval with respect to the porous material 6 to form the adiabatic expansion chamber 8 for the gas. In the adiabatic expansion chamber 8, the exhausted gas introduced through the introducing tube 2 is expanded to condense toxic components such as sulfurous acid gas and hydrogen carbide and water contained in the gas. The apparatus is constructed in such a manner that the gas-separating chamber S in the box B is cooled by a cooling means such as the coolant in the cooling chamber C to reduce the temperature of the gas to be introduced to an optimum temperature for adiabatic expansion in order to increase greatly the effect of adiabatic expansion for separating and eliminating toxic components such as sulfurous acid gas and hydrogen carbide contained in the gas.

The gas condensed by reduction of temperature in the adiabatic expansion chamber converts some of its components into a liquid form which flows down into an exhaust tube 9 connected to the lower part of the box B and flows down and exits via the exhaust tube 9 by means of a drain pipe 10. Thus, the toxic components are converted into a liquid form due to condensation of the gas into droplets which flow down in the box B so that the gas can be purified. The purified gas is introduced into exhaust tube 4 provided with the suction blower 3, and is released through the tube 4. At this time, the purified gas to be released from the exhaust tube 4 may be heated, to raise the temperature, by a heat exchanger for releasing the gas efficiently.

Solid components may be gathered by filtering the purified gas introduced into the exhaust tube 4 from the separating chamber S, as by providing a gas filtering material 12 to act as a filter in front of the aperture 11 at the purified gas introducing side of the exhaust tube 4.

Figure 2:
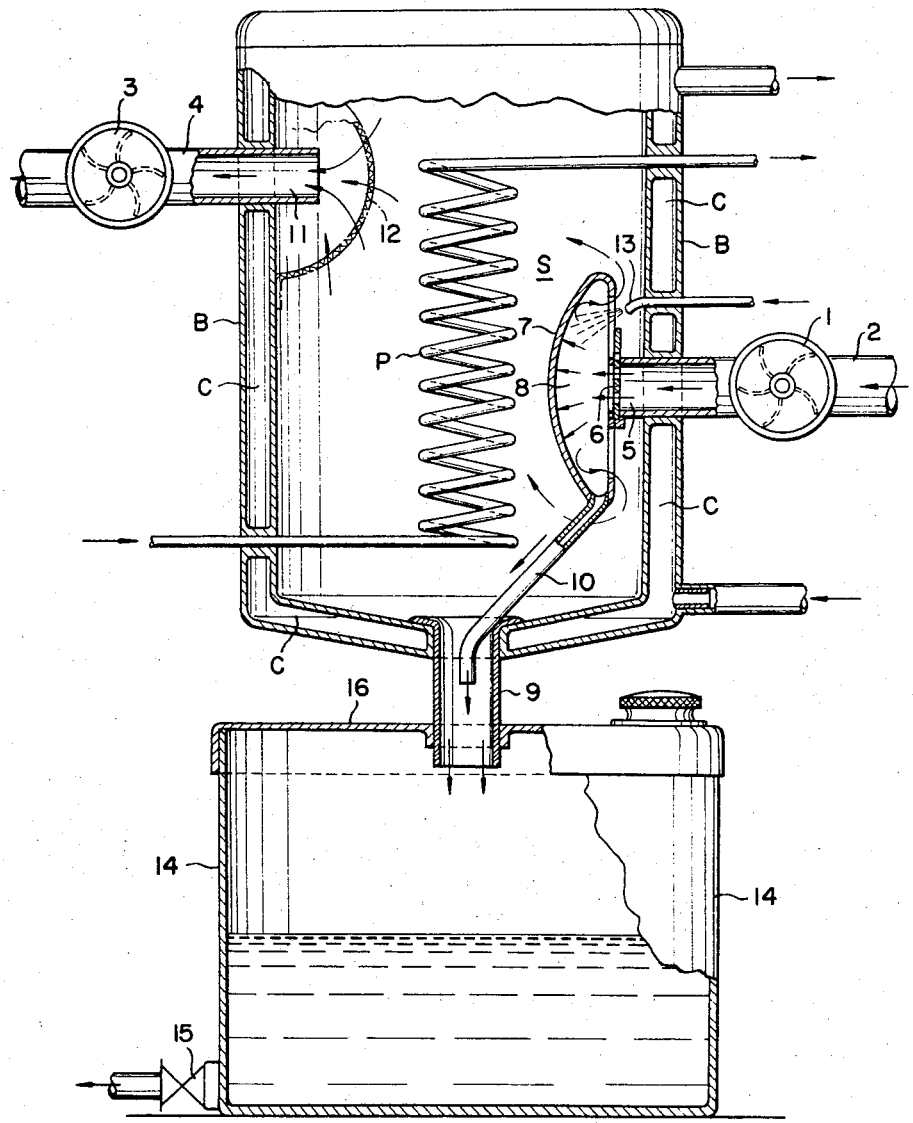
FIG. 2 and FIG. 3 are front sections respectively illustrating other examples of this invention.

Fluorine contained in the exhausted gas can be removed by a nozzle 13 positioned in the air chamber between the barrier material 7 and the porous air-permeable material 6, and caustic soda, sodium carbonate, or sodium hydroxide or the like is sprayed from the nozzle 13 to add the same to the gas. As the cooling means for the separating chamber S, the cooling chamber C is positioned outside the box B, and into the chamber cold air or water is introduced. As shown in FIG. 2, the temperature of the exhausted gas can be reduced by providing a cooling coil pipe P almost vertically at the center of the separating chamber S, and by passing cooling water through the pipe P to cool the separating chamber S by said cooling water as well as by a coolant in the cooling chamber C. Otherwise, the cooling coil pipe P may be used as the evaporator for a refrigerator using Freon or ammonia or as a cooler for air cooling to reduce the temperature of the gas in the separating chamber S, and also the temperature of the gas in the chamber S can be reduced with Dry-Ice which can be used as a gas coolant.

Figure 3:
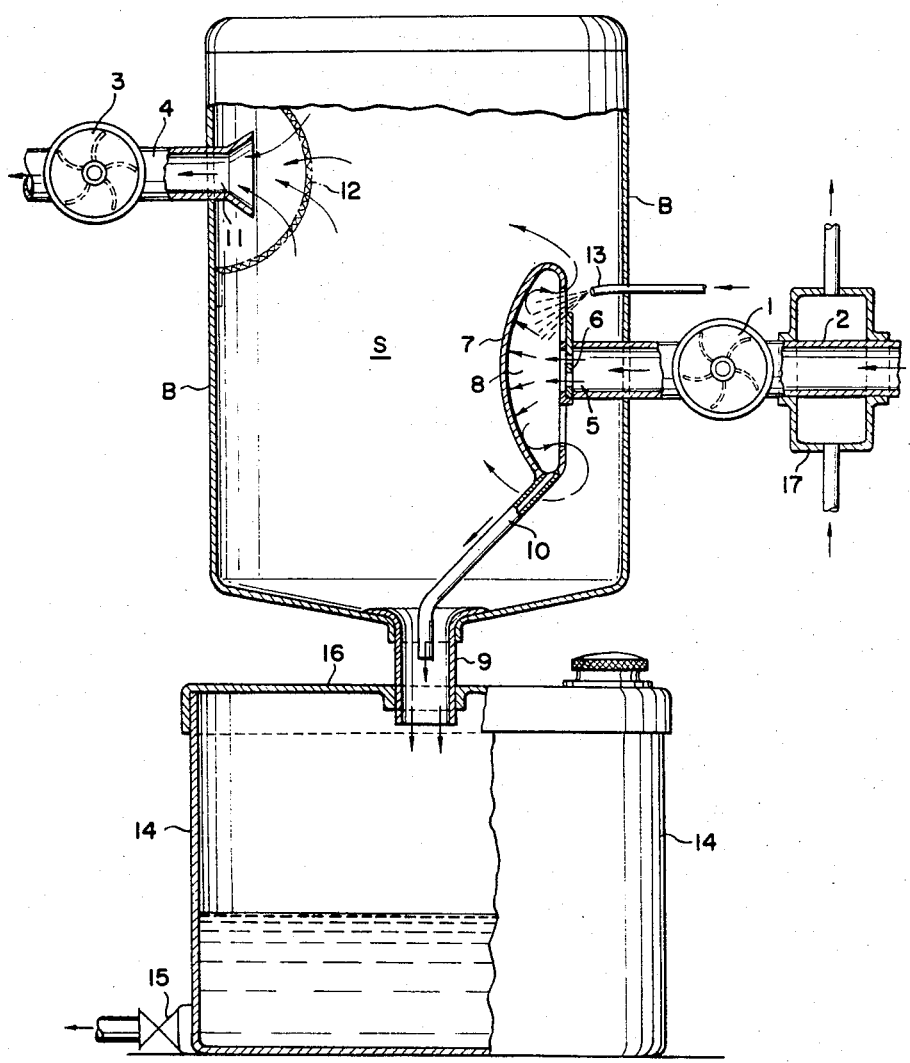

As shown in FIG. 3, in gas introducing tube 2, a cooling apparatus such as an evaporator of a cooler can be positioned in front of the blower 1, and the high-temperature gas introduced via the introducing tube 2 into the box B can be cooled by the cooling action of the cooling apparatus 17. The resulting low-temperature gas in introduced into the adiabatic expansion chamber to condense and separate the toxic components.

In this case, though the cooling chamber may be positioned on the outside wall of the box B as it is, the box may be constructed with the outside wall having no cooling chamber for convenience of construction.

A tank 14 for gathering the toxic components converted into a liquid form or water exhausted through the exhausting tube 9 is positioned under the box B, and an exhausting liquid valve 15 is provided at the bottom of the tank 14. The cover plate 6 at the top of tank 14 is also removable to take out the toxic liquid components in the tank. When separating and removing toxic components such as sulfurous acid gas and hydrogen carbide contained in the gas by adiabatic expansion of the gas, the higher the temperature of the exhausted gas is, the more the efficiency of condensing to convert the same into a liquid form by adiabatic expansion reduces, thereby lowering the effect of the separation and removal of the toxic components.

In this invention, on separating and removing toxic components by condensing the exhausted gas in an adiabatic expansion chamber, the optimum condition of temperature for adiabatic expansion can be held by cooling the separating chamber (the inside of the box) for the exhausted gas with some gaseous or liquid coolant to force the temperature to reduce. Thus, adiabatic expansion of the exhausted gas can be performed very effectively, and the effectiveness on separating and removing toxic components such as sulfurous acid gas and hydrogen carbide by converting the same into a liquid form can be greatly increased.

I claim:

1. Apparatus for purifying gas containing moisture and toxic components comprising a vessel, an adiabatic expansion chamber in the vessel, a gas inlet tube opening in said chamber, a filter disposed at the opening of the gas inlet tube into said chamber, an outlet tube for venting purified gas flowing out of said expansion chamber, a drain pipe for draining separated impurities out of said expansion chamber, a bowl-shaped barrier disposed in the expansion chamber and having a concave side facing towards said filter and spaced therefrom, the opening of the outlet tube being spaced from the convex side of said barrier, a nozzle for injecting a liquid mounted in the vicinity of said barrier to remove toxic components contained in the gas in the expansion chamber, and cooling means operatively associated with the vessel.

2. An apparatus according to claim 1, wherein the cooling means is a cooling chamber surrounding said vessel.

3. An apparatus according to claim 1, wherein the cooling means is a coil positioned in the said vessel.

4. An apparatus according to claim 1, wherein the cooling means is a cooling apparatus mounting on the gas inlet tube.

References Cited

UNITED STATES PATENTS

| | | | |
|---|---|---|---|
| 3,396,515 | 8/1968 | Wright | 55—269 |
| 3,522,000 | 7/1970 | Kinney | 55—269 |
| 3,581,469 | 6/1971 | Davis et al. | 55—269 |
| 3,180,072 | 4/1965 | Rapp | 55—269 |
| 3,103,426 | 9/1963 | Lantz, Jr. | 55—269 |
| 1,920,915 | 8/1933 | Poggel | 55—269 |
| 1,899,988 | 3/1933 | Ruemelin | 55—269 |

FOREIGN PATENTS

| | | |
|---|---|---|
| 507,959 | 6/1952 | Belgium. |

TIM R. MILES, Primary Examiner

U.S. Cl. X.R.

55—269